(12) United States Patent
Mahoney

(10) Patent No.: US 8,455,153 B2
(45) Date of Patent: Jun. 4, 2013

(54) REDUCTION-OXIDATION-TOLERANT ELECTRODES FOR SOLID OXIDE FUEL CELLS

(75) Inventor: F. Michael Mahoney, Holliston, MA (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 632 days.

(21) Appl. No.: 12/640,921

(22) Filed: Dec. 17, 2009

(65) Prior Publication Data

US 2010/0159356 A1  Jun. 24, 2010

Related U.S. Application Data

(60) Provisional application No. 61/203,185, filed on Dec. 19, 2008.

(51) Int. Cl.
*H01M 4/38* (2006.01)

(52) U.S. Cl.
USPC ........... 429/485; 429/479; 429/491; 429/495; 429/523

(58) Field of Classification Search
None
See application file for complete search history.

(56) References Cited

U.S. PATENT DOCUMENTS

| | | | |
|---|---|---|---|
| 2003/0027033 A1* | 2/2003 | Seabaugh et al. | 429/40 |
| 2004/0018409 A1 | 1/2004 | Hui et al. | |
| 2004/0033886 A1* | 2/2004 | Simwonis et al. | 502/101 |
| 2006/0240314 A1 | 10/2006 | Song et al. | |
| 2007/0176332 A1 | 8/2007 | Swartzlander et al. | |
| 2007/0237999 A1 | 10/2007 | Donahue et al. | |
| 2010/0216047 A1 | 8/2010 | Marlin et al. | |

FOREIGN PATENT DOCUMENTS

| | | |
|---|---|---|
| EP | 1768208 A2 | 3/2007 |
| JP | 2006040822 | 9/2006 |
| JP | 2010-538956 A | 12/2010 |

OTHER PUBLICATIONS

Transmittal of the International Search Report and the Written Opinion of the International Searching Authority, or the Declaration, International Application No. PCT/US2009/068507, date of mailing Jul. 13, 2010.
Transmittal of International Preliminary Report on Patentability and Written Opinion, International Application No. PCT/US2009/068507, mailed on Jun. 30, 2011.

* cited by examiner

*Primary Examiner* — Yelena G Gakh
(74) *Attorney, Agent, or Firm* — Robert N. Young; Abel Law Group, LLP

(57) ABSTRACT

An anode component of a solid oxide fuel cell is formed by combining a relatively coarse yttria-stabilized-zirconium (YSZ) powder, that is substantially composed of elongated particles, with a relatively fine NiO/YSZ or NiO powder of reduced particle size, whereby, upon sintering the combined powders, the coarse YSZ powder forms a microstructural cage of open porosity wherein the fine powder is distributed through the open porosity of the cage. A method of forming a cathode component includes combining a coarse YSZ powder, that is substantially composed of elongated particles, with a fine lanthanum strontium manganite powder of reduced particle size, whereby, upon sintering the combined powders, the coarse YSZ powder forms a microstructural cage of open porosity, wherein the fine powder is distributed through the open porosity of the cage.

23 Claims, 5 Drawing Sheets

REDUCTION-OXIDATION-TOLERANT ELECTRODES FOR SOLID OXIDE FUEL CELLS

RELATED APPLICATION

This application claims the benefit of U.S. Provisional Application No. 61/203,185, filed on Dec. 19, 2008.

The entire teachings of the above application are incorporated herein by reference.

BACKGROUND OF THE INVENTION

A fuel cell is a device that generates electricity by a chemical reaction. Among various fuel cells, solid oxide fuel cells use a hard, ceramic compound metal (e.g., calcium or zirconium) oxide as an electrolyte. Typically, in solid oxide fuel cells, an oxygen gas, such as $O_2$, is reduced to oxygen ions ($O^{2-}$) at the cathode, and a fuel gas, such as $H_2$ gas, is oxidized with the oxygen ions to form water at the anode. Fuel cells are generally designed as stacks, whereby subassemblies, each including a cathode, an anode and a solid electrolyte between the cathode and the anode, are assembled in series by locating an electrical interconnect between the cathode of one subassembly and the anode of another.

Anode compositions for solid oxide fuel cells (SOFCs) are typically composed of mixtures of nickel oxide (NiO) and yttria-stabilized zirconia (YSZ). During operation in a reducing (hydrogen) atmosphere, the NiO reduces to nickel (Ni) metal, which then acts as the electrically-conducting phase. For the typical mixtures composed of approximately equal-sized, spherical powders in a uniform distribution, a minimum fraction of approximately 30 vol. % Ni is required to percolate sufficient Ni metal throughout the anode microstructure to conduct electricity without excessive resistance. See N. Q. Minh, *Ceramic Fuel Cells*, J. Am. Ceram. Soc. Vol. 76 (3), pp. 563-588 (1993). Considering the volume loss upon reduction of NiO to Ni, 30 vol. % Ni requires approximately 42 vol. % NiO, which corresponds to a minimum fraction of approximately 45 wt. % NiO in a mixture with YSZ.

SOFC anode compositions are typically composed of as much as 70-80 wt. % NiO for several reasons. The high fraction of NiO ensures good electrical conductivity and creates microstructures with increased mechanical strength. In addition, since the decrease in volume from NiO to Ni is manifested in a porosity gain within the microstructure, increasing NiO fractions also increase the volume reduction, providing an in-situ method for creating higher porosity in the anode. However, increasing fractions of NiO create difficulties during reduction-oxidation (redox) cycles. Repeated cycling from operating conditions at elevated temperatures in reducing atmospheres to shut-down conditions at low temperatures in oxidizing atmospheres creates cyclic stress conditions in the anode microstructure due to volume changes and differences in coefficient of thermal expansion. For example, a NiO/YSZ composition containing 80 vol. % NiO will exhibit an approximately 33% redox volume change. The commonly-held lower limit of 45 wt. % NiO (30 vol. % Ni) corresponds to an approximate 18% redox volume change. Thermal stress induced by cycling between reducing and oxidizing atmospheres is a known failure mode over the lifetime of solid oxide fuel cells, and is generally referred to as redox tolerance.

Therefore, there is a need to reduce or eliminate volume changes during operation of a solid oxide fuel cell.

A constant concern in the manufacturing and operation of solid oxide fuel cells is the development of mismatch stresses between different component layers due to differences in thermal expansion coefficients. With manufacturing temperatures in the range of 1,100-1,400° C. and operating temperatures in the range of 600-1,000° C., even small differences in coefficients of thermal expansion (CTE) can generate significant cyclic stresses and cause failure in a solid oxide fuel cell stack. In general, a key criterion for choosing combinations of anode and cathode compositions is minimizing the difference in the coefficient of thermal expansion between room temperature and the manufacturing temperature or operating temperature. However, since many additional properties must be optimized for anode and cathode performance, larger-than-desired CTE differences must often be tolerated.

Therefore, there is a need to reduce or eliminate cyclic thermal stresses that develop in solid oxide fuel cells because of differences in coefficients of thermal expansion.

SUMMARY OF THE INVENTION

This invention generally is directed to a method of forming electrode components of a solid oxide fuel cell by using relatively large, elongate-shaped ceramic powders in combination with finer ceramic powders.

In one embodiment, a method of forming an anode component of a solid oxide fuel cell includes combining a relatively coarse yttria-stabilized-zirconia (YSZ) powder, that is substantially composed of elongated particles, with a relatively fine NiO/YSZ or NiO powder of reduced particle size, whereby, upon sintering the combined powders, the coarse YSZ powder forms a microstructural cage of open porosity, wherein the fine powder is distributed through the open porosity of the cage, and sintering the coarse YSZ powder with the fine NiO/YSZ or NiO powder combination to form the anode component. In another embodiment, a method of forming a cathode component of a solid oxide fuel cell includes combining a relatively coarse yttria-stabilized-zirconia (YSZ) powder, that is substantially composed of elongated particles, with a relatively fine lanthanum strontium manganite (LSM) powder of reduced particle size, whereby, upon sintering the combined powders, the coarse YSZ powder forms a microstructural cage of open porosity, wherein the fine powder is distributed through the open porosity of the cage, and sintering the coarse YSZ powder with the fine LSM powder combination to form the cathode component. In some embodiments, the particles of the coarse powder have a median particle size, $d_{50}$, in a range of between about 15 microns and about 60 microns and a median particle aspect ratio in a range of between about 1.2 and 3.0. In certain embodiments, the particles of the coarse powder have a median particle size, $d_{50}$, in a range of between about 15 microns and about 50 microns and a median particle aspect ratio in a range of between about 1.2 and 2.0. The particles of the fine powder can have a median particle size, $d_{50}$, in a range of between about 0.5 microns and about 8 microns. The weight ratio of fine:coarse powders can be in a range of between about 1:4 and about 3:2. In a specific embodiment, the weight ratio can be about 2:3.

In another embodiment, an anode of a solid oxide fuel cell includes a microstructural cage component of sintered elongated YSZ particles, the cage being of open porosity, and a nickel component distributed through the open porosity of the cage component. The volume percent of the nickel component and the cage component can be in a range of between about 1:8 and about 1:1. In a specific embodiment, the nickel component occupies about 27 volume percent of the solids volume in the anode component.

In yet another embodiment, a cathode of a solid oxide fuel cell includes a microstructural cage component of sintered elongated YSZ particles, the cage being of open porosity, and an LSM component distributed through the open porosity of the cage component. The volume percent of the LSM component and the cage component can be in a range of between about 1:8 and about 1:1. In a specific embodiment, the LSM component occupies about 27 volume percent of the solids volume in the anode component.

In still another embodiment, a solid oxide fuel cell includes an anode layer that includes a microstructural cage component of sintered elongated YSZ particles, the cage being of open porosity, and a nickel component distributed through the open porosity of the cage component, an electrolyte layer, and a cathode layer that includes a microstructural cage component of sintered elongated YSZ particles, the cage being of open porosity, and an LSM component distributed through the open porosity of the cage component.

This invention has many advantages, including enabling the manufacturing of electrodes with improved reduction-oxidation tolerance, and the elimination of the need to precisely define and control the stoichiometry of anode and cathode compositions to minimize CTE differences. For example, this invention addresses the problem of CTE-related stress development by using the same material as the foundation of both the anode and cathode microstructures. For example, a relatively coarse particle-sized YSZ powder can be used in combination with a relatively fine particle-sized NiO or NiO/YSZ powder to produce an anode component; the same relatively coarse YSZ powder can be used in combination with a relatively fine particle-sized LSM to produce a cathode component. In both components, the coarse YSZ particles form a microstructural cage that controls the densification and expansion strain of the component, whereas the additions of fine NiO, NiO/YSZ and LSM form the functional properties of the components, such as electrical conductivity and oxidation-reduction tolerance.

This invention also addresses the problem of redox-induced failure in anode components within SOFC stacks. Anode microstructures described by this invention contain significantly lower fractions of NiO (and thus Ni) compared to common anode compositions of 70-80 wt. % NiO and can contain lower fractions of NiO than the commonly-known lower limit of approximately 45 wt. % NiO. At such low fractions of NiO, it is commonly difficult to form microstructures with sufficient porosity and electrical conductivity. These difficulties were solved by using a composite composition of relatively coarse, elongated particle size distribution of YSZ powder and a relatively fine particle size distribution of NiO/YSZ or NiO powder. The coarse YSZ powder formed a microstructural cage with high mechanical impingement between particles, preventing volume reduction during densification and thereby maintaining a large volume fraction of porosity. A fine spherical, or fine elongate-shaped particle distribution of NiO/YSZ or NiO percolates through the large fraction of open porosity in the YSZ microstructural cage.

An advantage of this method over commonly-used methods is reduction or elimination of the need to precisely define and control the stoichiometry of anode and cathode compositions to minimize CTE differences. The finely-dispersed additions of NiO, NiO/YSZ and LSM can be optimized while minimizing the concern for affecting the overall thermal expansion behavior of the component which is controlled by the coarse structure of the YSZ material.

BRIEF DESCRIPTION OF THE DRAWINGS

The foregoing will be apparent from the following more particular description of example embodiments of the invention, as illustrated in the accompanying drawings. The drawings are not necessarily to scale, emphasis instead being placed upon illustrating embodiments of the present invention.

FIG. 7 is a higher magnification micrograph of the anode component shown in

FIG. 6.

DETAILED DESCRIPTION OF THE INVENTION

Reduction-Oxidation-Tolerant Anode Compositions

Figure 1:
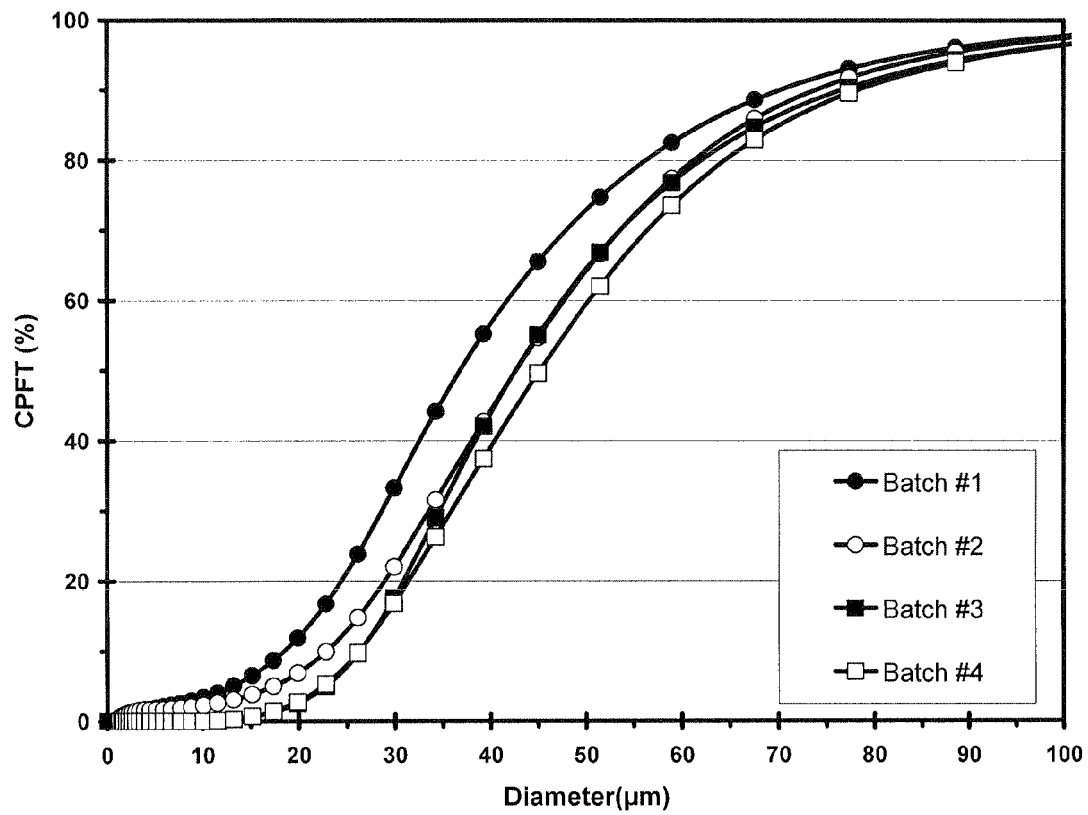
FIG. 1 is a graph of the particle size distribution (PSD) for four batches of coarse YSZ powder.

In one embodiment, this invention is a method by which anode microstructures can be formed with significantly improved reduction-oxidation tolerance by using large, elongate-shaped ceramic powders in combination with finer ceramic powders.

In another embodiment, novel features of this invention include a sufficient electrical conductivity with less than the commonly-held lower limit of 30 vol. % Ni and a composite anode microstructure composed of coarse elongated YSZ particles and fine spherical, or fine elongated NiO/YSZ or NiO particles.

In still another embodiment, this invention is directed to a method of making bulk anode and bulk cathode components such that their coefficients of thermal expansion are equivalent even though their compositions, chemical properties and electrochemical performance are significantly different. In this way, cyclic thermal stresses that develop in solid oxide fuel cell stacks because of differences in thermal expansion coefficients can be eliminated.

In yet another embodiment, this invention can include a common, coarse-sized material in both the bulk anode and bulk cathode components. The common material will dominate the structure of each component in terms of forming an open microstructure with large pores. In addition, each electrode component will contain a different fine-sized material to form the electrical and chemical properties.

Elongate-shaped ceramic powders can be made by the following manufacturing process. A ceramic body is formed of the desired powder material. The ceramic body is preferably at least a millimeter in length, i.e., all dimensions exceed at least 1 mm. The ceramic body can be made by sintering, sintering under pressure ("IP"), hot isostatic pressing ("HIP"), SPS ("Spark Plasma Sintering"), or fusion. The objective is to manufacture body masses having a sufficient resistance "to burst" during subsequent crushing. In other words, one should not consider that the prepared body masses are simple agglomerations of grains likely to be destroyed during crushing. Such a crumbling does not make it possible to obtain sufficient grains elongated for industrial use. The ceramic body can be crushed, preferably using a roller crusher, resulting in particles. The particles are selected, for example, by sifting to have a size greater than the maximum size of the grains of the powder to be manufactured, preferably by selection of the particles having a size at least two times greater than this maximum size and/or less than four times this maximum size. The selected particles are then crushed under shear stress conditions, in particular by means of a roller crusher. Crushers by attrition are not adapted to effectively manufacture a high quantity of elongated grains.

By particle or "grain size" distribution, one understands the size of a grain given by a characterization of granular distribution carried out with a laser particle-measurement instrument, such as, for example, a Partica LA-950 from Horiba (Horiba Instruments, Inc., Irvine, Calif.).

Percentiles 10 ($d_{10}$), 50 ($d_{50}$), and 90 ($d_{90}$) are the sizes of grains corresponding to the percentages, in volume, of 10%, 50%, and 90%, respectively, on the curve of cumulated granular distribution of the sizes of grains of the powder. The sizes of grains are classified in ascending order. For example, 10%, in volume, of the grains of the powder have a size less than $d_{10}$ and 90% of the grains in volume have a size greater than $d_{10}$. The percentiles can be given using a granular distribution carried out using the laser particle-measurement instrument.

The aspect ratio (abbreviated as "AR") is defined as follows. The ratio $AR_{50}$ is measured between greatest apparent dimension, or "length" L, and smallest apparent dimension, or "width" W, of a grain. The length and the width of a grain are typically measured by the following method. A sample of YSZ powder is lightly sprinkled over a glass microscope slide, leaving behind a monolayer of powder on the slide. The slide is placed on a piece of black background. Areas with few grains touching each other are sought for analysis. A Nikon DXM 1200 digital camera captures images at a resolution of 1280×1024 pixels. Six images are captured per sample as well as an image of the calibration slide. This method produces 600-1100 measured objects for each of six images. These images are preferably acquired in zones where the grains are separated best, in order to facilitate thereafter the determination of the ratio. On each image of each grain, the greatest apparent dimension (length L), and the smallest apparent dimension (width W) are measured. Preferably, these dimensions are measured using software of image processing, such as, for example, VISILOG available from NOESIS (Saint Aubin, France), or SimplePCI Image Analysis software (Hamamatsu Corporation, Sewickley, Pa., USA). For each grain, the ratio of L/W is calculated. The distribution of the ratio of the powder can then be found. The "median ratio" $AR_{50}$ of the grains is the value of the ratio with 50% of the grains having a ratio less than this value and 50% of the grains having a ratio greater than this value.

In still another embodiment, a solid oxide fuel cell includes an anode layer as described above that includes a microstructural cage component of sintered elongated YSZ particles, the cage being of open porosity, and a nickel component distributed through the open porosity of the cage component, an electrolyte layer, and a cathode layer as described above that includes a microstructural cage component of sintered elongated YSZ particles, the cage being of open porosity, and an LSM component distributed through the open porosity of the cage component.

Any suitable solid electrolytes known in the art can be used in the invention such as those described in "High Temperature Solid Oxide Fuel Cells: Fundamentals, Design and Applications," pp. 83-112, Dinghal, et al. Ed., Elsevier Ltd. (2003), the entire teachings of which are incorporated herein by reference. Examples include YSZ, lanthanum strontium manganate (LSM), $ZrO_2$ based materials, such as $Sc_2O_3$-doped $ZrO_2$, $Y_2O_3$-doped $ZrO_2$, and $Yb_2O_3$-doped $ZrO_2$; $CeO_2$ based materials, such as $Sm_2O_3$-doped $CeO_2$, $Gd_2O_3$-doped $CeO_2$, $Y_2O_3$-doped $CeO_2$ and CaO-doped $CeO_2$; Ln-gallate based materials (Ln=a lanthanide, such as La, Pr, Nd or Sm), such as $LaGaO_3$ doped with Ca, Sr, Ba, Mg, Co, Ni, Fe or a mixture thereof (e.g., $La_{0.8}Sr_{0.2}Ga_{0.8}Mg_{0.2}O_3$, $La_{0.8}Sr_{0.2}Ga_{0.8}Mg_{0.15}Co_{0.05}O_3$, $La_{0.9}Sr_{0.1}Ga_{0.8}Mg_{0.2}O_3$, $LaSrGaO_4$, $LaSrGa_3O_7$ or $La_{0.9}A_{0.1}GaO_3$ where A=Sr, Ca or Ba); and mixtures thereof. Other examples include doped yttrium-zirconate (e.g., $YZr_2O_7$), doped gadolinium-titanate (e.g., $Gd_2Ti_2O_7$) and brownmillerites (e.g., $Ba_2In_2O_6$ or $Ba_2In_2O_5$).

Figure 9:
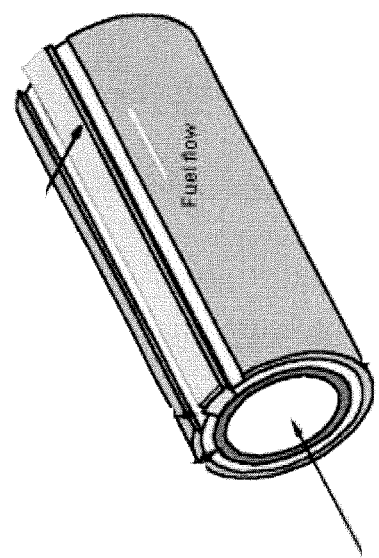
FIG. 9 is a schematic diagram of a fuel cell of the invention in a tubular design.
Figure 8:
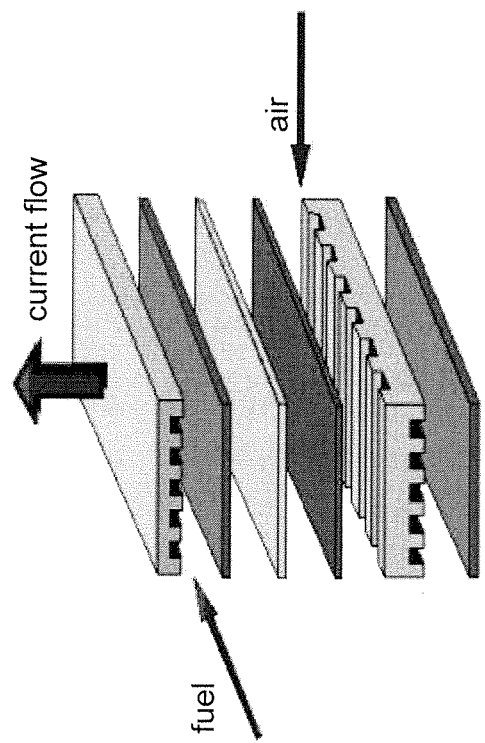
FIG. 8 is a schematic diagram of a fuel cell of the invention in a planar, stacked design.

A fuel cell of the invention can be a planar stacked fuel cell, as shown in FIG. 8. Alternatively, as shown in FIG. 9, a fuel cell of the invention can be a tubular fuel cell. Typically, in the planar design, as shown in FIG. 8, the components are assembled in flat stacks, with air and fuel flowing through channels built into the interconnect. Typically, in the tubular design, as shown in FIG. 9, the components are assembled in the form of a hollow tube, with the cell constructed in layers around a tubular cathode; air flows through the inside of the tube and fuel flows around the exterior.

EXEMPLIFICATION

Four batches of coarse YSZ powder were made by the manufacturing process described above. Table 1 below and FIG. 1 show the particle size distribution (PSD) of the four batches.

TABLE 1

| Batch # | PSD | | |
| --- | --- | --- | --- |
| | [$d_{10}$] | [$d_{50}$] | [$d_{90}$] |
| 1 | 18.38 | 36.80 | 70.40 |
| 2 | 22.85 | 42.61 | 74.24 |
| 3 | 26.28 | 42.61 | 76.60 |
| 4 | 26.23 | 45.13 | 78.32 |

Figure 2:
FIG. 2 is a micrograph of a representative sample of YSZ grains.
Figure 3:
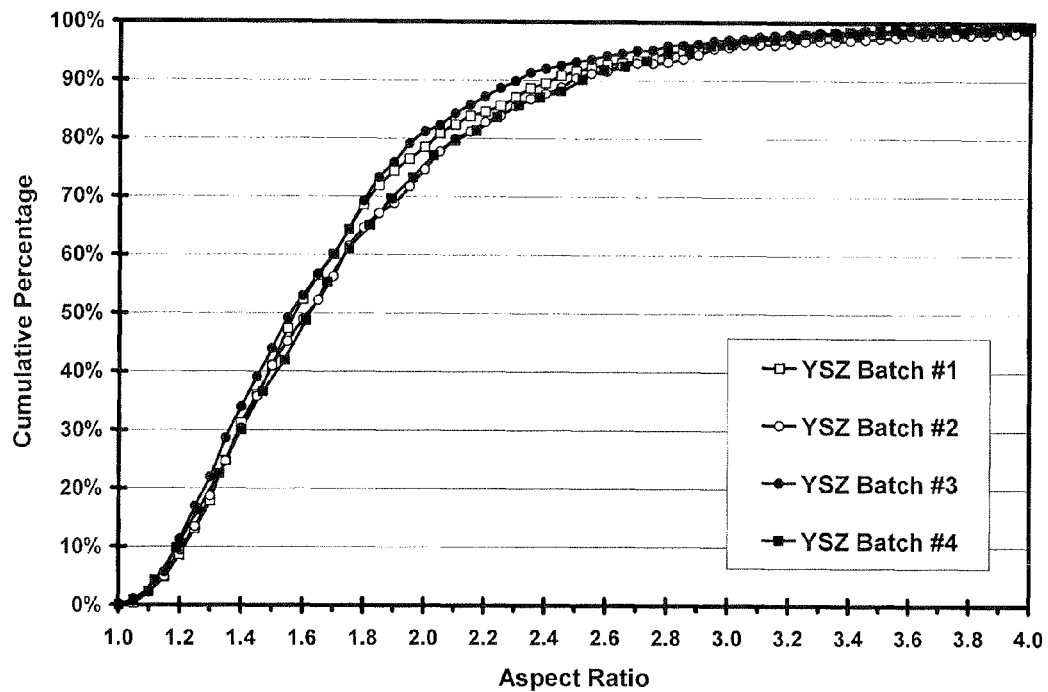
FIG. 3 is a graph of the aspect ratio distribution of four batches of coarse YSZ powder.

FIG. 2 shows a typical micrograph of a representative sample of YSZ grains. Table 2 below shows $AR_{50}$ values, and FIG. 3 is a graph of the aspect ratio distributions of the four batches of YSZ powders.

TABLE 2

| Batch # | $AR_{50}$ |
| --- | --- |
| 1 | 1.58 |
| 2 | 1.62 |
| 3 | 1.56 |
| 4 | 1.62 |

Figure 4:
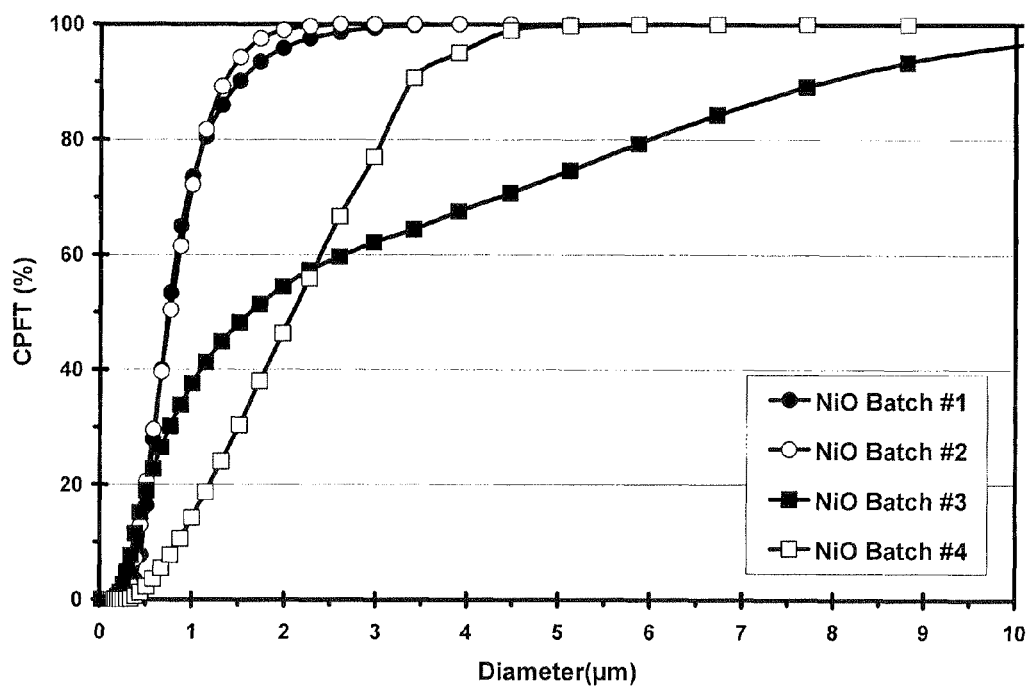
FIG. 4 is a graph of the PSD for four batches of fine NiO powder.

A wet dispersion mixture of 60 wt. % coarse, elongated YSZ powder and 40 wt. % fine NiO powder was made by the following process. One gram of dispersant (Darvan® C (R. T. Vanderbilt, Norwalk, Conn.)) and 80 g of fine NiO powder, with mean particle size of 0.74 μm, was added to 80 g of deionized water in a nalgene bottle. The PSD of the NiO powder (Batch #1) is shown in Table 3 below and illustrated in the graph shown in FIG. 4.

TABLE 3

| Batch # | PSD | | |
|---|---|---|---|
| | [$d_{10}$] | [$d_{50}$] | [$d_{90}$] |
| 1 | 0.46 | 0.74 | 1.50 |
| 2 | 0.42 | 0.76 | 1.35 |
| 3 | 0.37 | 1.63 | 7.90 |
| 4 | 0.89 | 2.06 | 3.70 |

Small zirconia milling media was added to half the height of the water level and the mixture was rolled for 12 hours. Subsequently, 120 g of coarse, elongated YSZ powder, with a mean particle size of about 37 μm and a median aspect ratio of 1.58 (Batch #1 shown in Tables 1 and 2), was added to the slurry mixture with 14 g of polyvinyl alcohol and 3 g of polyethylene glycol binder before rolling for one hour. After rolling, the milling media was separated from the powder mixture using a sieve. The wet powder mixture was dried on a hot-plate by evaporation over several hours while being stirred.

The resulting dry powder mixture was dry-pressed under a uniaxial pressure of 3,000 psi in a die to form an anode component disk with dimensions of 57 mm diameter and 5 mm height. The anode component disk was subsequently hot-pressed between two dense alumina platens in an oxidizing atmosphere at a temperature of 1,320° C. for 30 minutes under a uniaxial pressure of 7 MPa.

The resulting anode component was exposed to a reducing gas composition containing hydrogen at 800° C. to convert all the NiO to metallic nickel. The weight of the sample before and after reduction was measured to confirm complete reduction. Density measurements showed the component microstructure to contain 43% porosity after reduction. The disk was then sliced into bars for characterization of thermal expansion and electrical conductivity.

Thermal expansion and electrical conductivity measurements were performed in reducing gas compositions containing hydrogen. The coefficient of thermal expansion (CTE) was calculated from a best fit line through the expansion data from room temperature to 1,200° C. Electrical conductivity was measured in a standard 4-probe set up at 25, 800, 900 and 1000° C.

Figure 5:
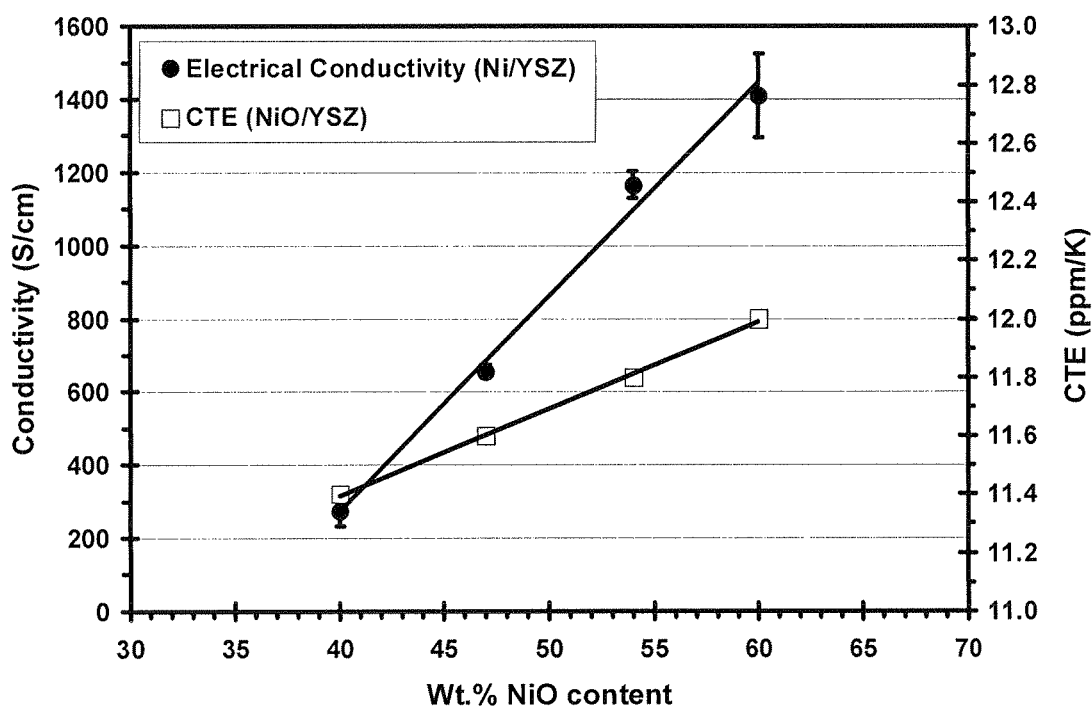
FIG. 5 is a graph of the conductivity and CTE as a function of wt. % of NiO of anode components manufactured by the method of the invention.
Figure 6:
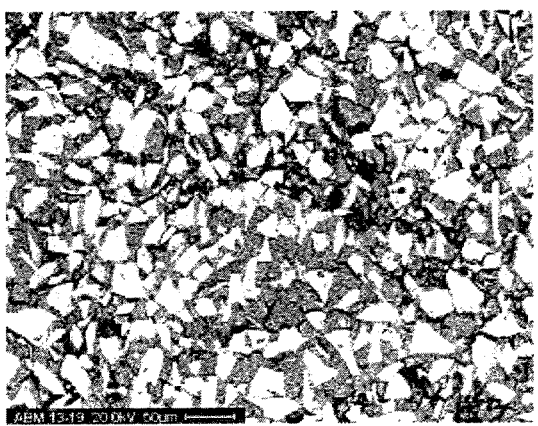
FIG. 6 is a micrograph of the microstructure of an anode component manufactured by the method of the invention.
Figure 7:
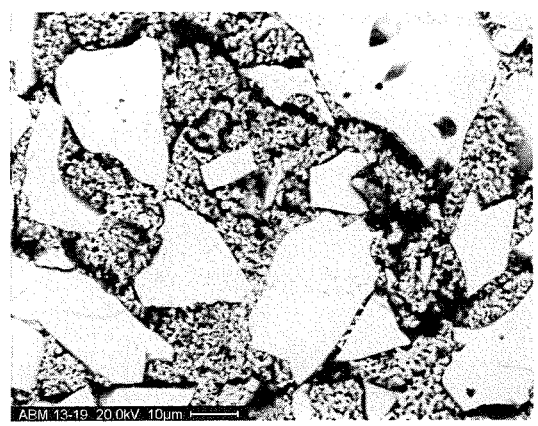

Table 4 below and FIG. 5 show the data for the anode component manufactured as above with 40 wt. % NiO as well as for three other compositions similarly manufactured with increasing amounts of NiO. FIGS. 6 and 7 show micrographs of the microstructure of an anode component manufactured by the method described above.

TABLE 4

| Wt. % NiO | Conductivity at 900° C. (S/cm) | STD DEV | CTE (RT-1200) (ppm/K) |
|---|---|---|---|
| 40 | 272 | 41 | 11.4 |
| 47 | 656 | 17 | 11.6 |
| 54 | 1166 | 37 | 11.8 |
| 60 | 1408 | 115 | 12 |

An experimental anode composition containing 60 wt. % coarse, elongated YSZ and 40 wt. % fine NiO powder has measured an electrical conductivity of 272 S/cm, which is greater than the sufficient value of 100 S/cm, suitable for SOFC anodes. For the conductivity standard, see H. Itoh, et al., Electrochemical Society Proceedings, Volume 2001-16, pp. 750-758 (2001).

The teachings of all patents, published applications and references cited herein are incorporated by reference in their entirety.

EQUIVALENTS

While this invention has been particularly shown and described with references to example embodiments thereof, it will be understood by those skilled in the art that various changes in form and details may be made therein without departing from the scope of the invention encompassed by the appended claims.

What is claimed is:

1. A method of forming an anode of a solid oxide fuel cell, comprising the steps of:
   a) combining a yttria-stabilized-zirconia (YSZ) powder with a NiO/YSZ or NiO powder, wherein particles of the YSZ powder are fused, elongate-shaped YSZ particles having a median particle size, $d_{50}$, in a range of between about 15 microns and about 60 microns and a median particle aspect ratio, $AR_{50}$, in a range of between about 1.2 and 3.0, and particles of the NiO/YSZ or NiO powder are particles having a median particle size, $d_{50}$, in a range of between about 0.5 microns and about 8 microns; and
   b) sintering the YSZ powder with the NiO/YSZ or NiO powder combination to form the anode component, wherein, upon sintering the combined powders, the fused, elongate-shaped YSZ particles form a microstructural cage of open porosity, wherein the NiO/YSZ or NiO particles are distributed through the open porosity of the cage.

2. The method of claim 1, wherein the fused, elongate-shaped YSZ particles have an aspect ratio, $AR_{90}$, in a range of between about 2.2 and 2.6.

3. The method of claim 1, wherein the fused, elongate-shaped YSZ particles have a median particle size, $d_{50}$, in a range of between about 15 microns and about 50 microns and a median particle aspect ratio, $AR_{50}$, in a range of between about 1.2 and 2.0.

4. The method of claim 1, wherein the NiO/YSZ or NiO particles have a median particle size, $d_{50}$, in a range of between about 0.5 microns and about 8 microns.

5. The method of claim 1, further comprising a weight ratio of NiO/YSZ or NiO powder-to-YSZ powder in a range of between about 1:4 and about 3:2.

6. The method of claim 5, wherein the weight ratio is about 2:3.

7. An anode of a solid oxide fuel cell, comprising:
   a) a microstructural cage component formed of fused, elongated YSZ particles, the cage being of open porosity; and
   b) a nickel component distributed within the open porosity of the cage component, wherein the anode was formed according to the method of claim 1.

8. The anode of claim 7, wherein the volume percent of the nickel component and the cage component is in a range of between about 1:8 and about 1:1.

9. The anode of claim 7, wherein the nickel component occupies about 27 volume percent of the solids volume in the anode component.

10. A method of forming a cathode of a solid oxide fuel cell, comprising the steps of:
    a) combining YSZ powder with a lanthanum strontium manganite (LSM) powder, wherein particles of the YSZ powder are fused, elongate-shaped YSZ particles having a median particle size, $d_{50}$, in a range of between about 15 microns and about 60 microns and a median particle aspect ratio, $AR_{50}$, in a range of between about 1.2 and 3.0, and wherein particles of the LSM powder are particles having a median particle size, $d_{50}$, in a range of between about 0.5 microns and about 8 microns; and b) sintering the YSZ powder with the LSM powder combination to form the cathode component, whereby, upon sintering the combined powders, the fused, elongate-shaped YSZ particles form a microstructural cage of open porosity, wherein the LSM particles are distributed through the open porosity of the cage.

11. The method of claim 10, wherein the fused, elongate-shaped YSZ particles have an aspect ratio, $AR_{90}$, in a range of between about 2.2 and 2.6.

12. The method of claim 10, wherein the fused, elongate-shaped YSZ particles have a median particle size, $d_{50}$, in a range of between about 15 microns and about 50 microns and a median particle aspect ratio, $AR_{50}$, in a range of between about 1.2 and 2.0.

13. The method of claim 10, wherein the LSM particles have a median particle size, $d_{50}$, in a range of between about 0.5 microns and about 8 microns.

14. The method of claim 13, wherein the weight ratio of YSZ:LSM powders is in a range of between about 1:4 and about 3:2.

15. The method of claim 14, wherein the weight ratio is about 2:3.

16. A cathode of a solid oxide fuel cell, comprising:
   a) a microstructural cage component formed of fused, elongated YSZ particles, the cage being of open porosity; and
   b) a lanthanum strontium manganite (LSM) component distributed within the open porosity of the cage component, wherein the cathode was formed according to the method of claim 10.

17. The cathode of claim 16, wherein the volume percent of the LSM component and the cage component is in a range of between about 1:8 and about 1:1.

18. The cathode of claim 16, wherein the LSM component occupies about 27 volume percent of the solids volume in the cathode component.

19. A solid oxide fuel cell, comprising:
   a) an anode layer that includes,
      i) a microstructural cage component formed of fused, elongated YSZ particles, the cage being of open porosity; and
      ii) a nickel component distributed within the open porosity of the cage component, wherein the anode was formed according to the method of claim 1;
   b) an electrolyte layer; and
   c) a cathode layer that includes,
      i) a microstructural cage component formed of fused, elongated YSZ particles, the cage being of open porosity; and
      ii) a lanthanum strontium manganite (LSM) component distributed within the open porosity of the cage component, wherein the cathode was formed according to the method of claim 10.

20. The solid oxide fuel cell of claim 19, wherein the volume percent of the nickel component and the cage component is in a range of between about 1:8 and about 1:1.

21. The solid oxide fuel cell of claim 19, wherein the nickel component occupies about 27 volume percent of the solids volume in the anode component.

22. The solid oxide fuel cell of claim 19, wherein the volume percent of the LSM component and the cage component is in a range of between about 1:8 and about 1:1.

23. The solid oxide fuel cell of claim 19, wherein the LSM component occupies about 27 volume percent of the solids volume in the anode component.

* * * * *